United States Patent [19]

Patterson et al.

[11] Patent Number: 5,630,338

[45] Date of Patent: May 20, 1997

[54] BICYCLE DERAILLEUR CABLE PRELOAD AND SEALING SYSTEM

[75] Inventors: Sam Patterson; Frederick W. Day; Michael Larson; Brian Jordan, all of Chicago, Ill.

[73] Assignee: SRAM Corporation, Chicago, Ill.

[21] Appl. No.: 500,774

[22] Filed: Jul. 11, 1995

[51] Int. Cl.⁶ ........................................ F16C 1/22
[52] U.S. Cl. ........................... 74/502.6; 74/501.5 R
[58] Field of Search ........................... 74/502.4–502.6, 74/500.5, 501.5 R

[56] References Cited

U.S. PATENT DOCUMENTS

| | | | |
|---|---|---|---|
| 4,833,937 | 5/1989 | Nagano | 74/502.4 X |
| 4,889,005 | 12/1989 | Crack | 74/502.4 X |
| 5,009,122 | 4/1991 | Chaczyk et al. | 74/502.6 |
| 5,102,372 | 4/1992 | Patterson et al. | 74/502.4 X |

*Primary Examiner*—Charles A. Marmor
*Assistant Examiner*—Mary Ann Battista
*Attorney, Agent, or Firm*—Ralph C. Francis

[57] ABSTRACT

A cable pre-load system and device attachable between a moveable control cable and a rigid frame for regulating tension in the control cable and sealing the control cable against contamination. The tensioning device includes a cable connector, a resilient tubular member with two ends and a frame connector. The cable connector attaches one end of the tubular member to the control cable to form a static seal about the control cable. The frame connector attaches the other end of the tubular member to the frame. The tubular member stretches between a first configuration and a second configuration in response to movement of the control cable to regulate tension in the control cable.

11 Claims, 3 Drawing Sheets

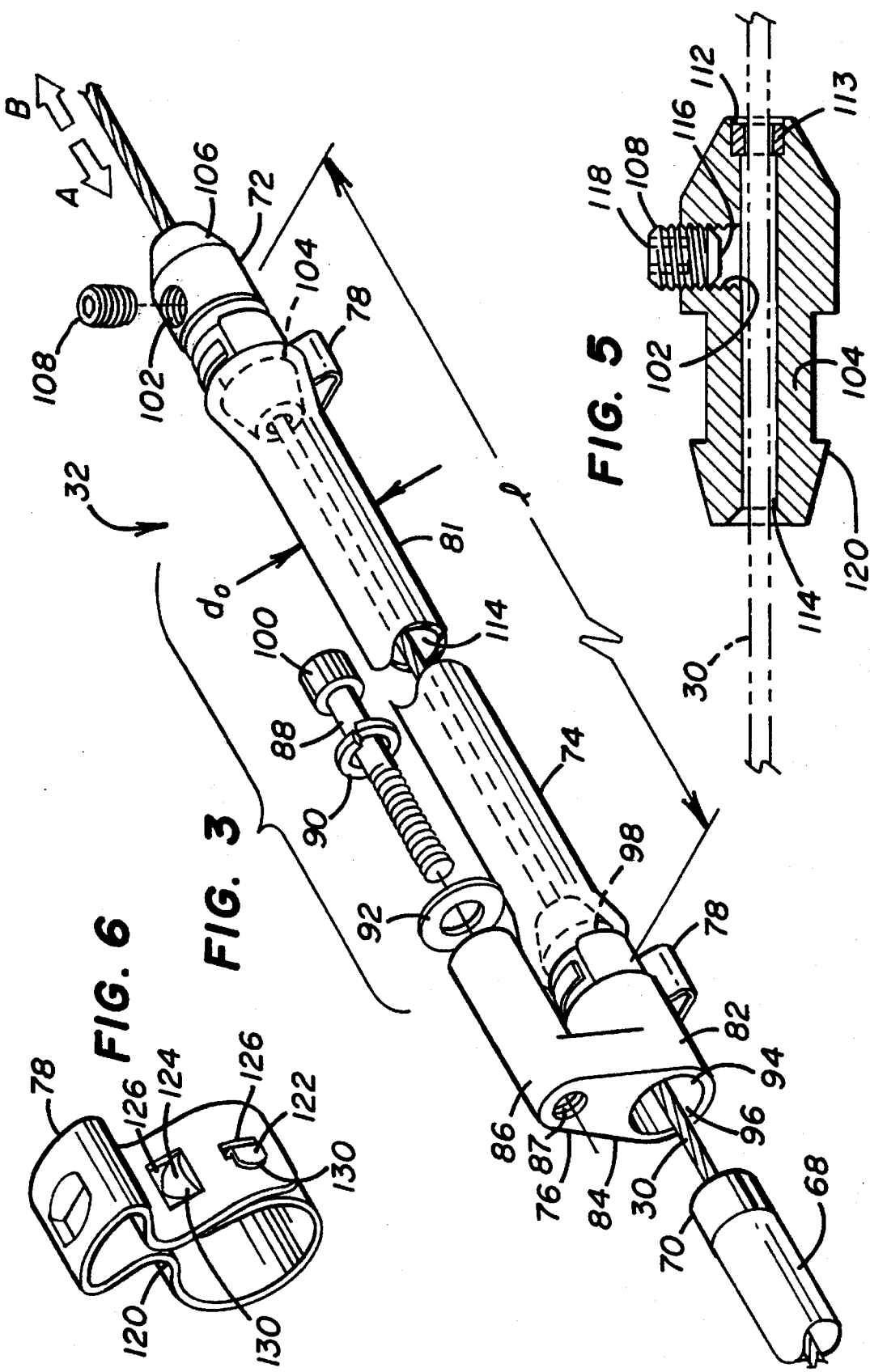

BICYCLE DERAILLEUR CABLE PRELOAD AND SEALING SYSTEM

CROSS-REFERENCE TO RELATED PATENTS

This invention relates to subject matter in U.S. Pat. Nos. 5,197,927; 4,900,291; 4,938,733; and 5,102,372. The disclosure of each related patent is incorporated herein by reference.

BACKGROUND OF THE INVENTION

1. Field of the Invention

This invention relates generally to bicycle gear shift systems having a cable actuated derailleur. More particularly, this invention relates to a cable pre-load and sealing system for a cable actuated derailleur.

2. Previous Art

Street and mountain bicycles ("mountain bikes") are typically equipped with gear shift systems having multiple gears for optimizing bicycle performance. Such gear shift systems are optimally adapted to operate with a high degree of precision and efficiency so that the time required to shift gears is minimized and bicycle performance is maximized. The gear shift systems typically include a series of freewheel sprockets, front and rear derailleurs, shift actuators and a control cable system.

The control cable system generally includes a central cable having a sheath which covers at least a portion of the control cable. Such control cables are commonly referred to as "Bowden type cables." The control cable is designed to slide axially and reciprocally with respect to the sheath.

In conventional derailleur-activated multiple-gear bikes, the rear derailleur is used to transfer the bicycle drive chain from one freewheel sprocket to another freewheel sprocket. The derailleur moves in response to displacement of the derailleur control cable. Pulling the control cable causes the rear derailleur to shift the drive chain to a larger and more inboard sprocket, producing a lower gear (downshifting). Releasing the control cable permits a cable-tensioning derailleur return spring to shift the drive chain to a smaller and more inboard sprocket, producing a higher gear (upshifting).

Bicyclists optimally desire smooth and rapid gear shifting. Minimizing the time required for shifting is a factor which affects shifting performance. During shifting, optimally, the chain is transferred from central alignment with one sprocket to central alignment with another sprocket. In practice, however, several derailleurs require overshift (i.e., briefly positioning the chain past central alignment of a sprocket during shifting) to move a chain from a smaller sprocket to a larger sprocket.

After overshift, the drive chain is returned to central alignment with the desired sprocket. Several systems have been employed to achieve "overshift return". For example, in some systems, overshift return is accomplished by manual readjustment of the shift actuator. In other systems the shift actuator includes an overshift return mechanism, such as a spring, to release the control cable and, hence, allow the derailleur to move the drive chain into central alignment with the desired sprocket. Details of a highly effective overshift return system are disclosed in Co-pending application Ser. No. 08/384,013 (Attorney Docket No. SRAM-01-002), filed Feb. 6, 1995.

During upshifting and overshift return, the control cable also slides axially with respect to the sheath. The cable tension moving the cable in the upshifting direction is limited by the force of the derailleur biasing spring. Thus, contamination, such as dirt or moisture, between the cable and the sheath can, and in many instances will, produce undesirable frictional forces. The frictional forces increase the force and time necessary to move the control cable. Accordingly, to optimize performance of the gear shift system, it is desirable to minimize such contamination and the resultant frictional forces.

Further, in general, the shift actuator produces "overtravel" of the control cable past the detented position corresponding to the target sprocket center. Hysteresis, a common phenomena in shifting systems, is exhibited in the cable linkage due to such factors as cable wire stretch, outer sheath compression, wear and/or excessive tolerances between the end cap and braze-on, end cap cable adjuster nut, and excessive wear and/or tolerances in the derailleur pivots. Since an increase in friction in the derailleur pivot and cable inner wire/sheath contact points increases the tension in the cable, the sheath compression and inner wire stretch will increase proportionally and, hence, increase the hysteresis.

A considerable portion of the cable overtravel produced by the shift actuator will be absorbed by the hysteresis. Overtravel above that which is absorbed by hysteresis will result in overshift at the derailleur. Overtravel at the shift actuator is typically 0.040 on a "high-end" product and up to 0.060 to 0.080 for a lower-end (large chain gap compatible) product. On a new, clean high-end bike, the hysteresis absorbs about 0.020 of overtravel. This produces an observable overshift at the derailleur of 0.02 times the actuation ratio. Thus, if the actuation ratio is approximately 2:1, the derailleur moves about 0.04 inches past the new sprocket center during a downshift. As the bike accumulates dirt (and corrosion), the hysteresis increases to a point where there is no observable overshift. Indeed, observable "undershift" is exhibited if the hysteresis exceeds the overtravel (Overtravel at the shifter, overshift at the derailleur).

On a low-end bike, the initial overtravel at the shifter is approximately 0.06 to 0.08 inches. On a new, low-end bike, the hysteresis is about the same as on a high-end bike, approximately 0.02 to 0.03. Thus, if the overtravel is approximately 0.06 and the hysteresis is 0.02, then the derailleur overshifts 0.04 times the actuation ratio or approximately 0.08.

In operation, it is actually desirable for the derailleur to hesitate in the overshifted position to assure that the shift occurs. Obviously, this is only important during downshifting. Hesitation, or duration is desirable as long as the derailleur returns to sprocket center reliably after the shift is completed. As the low-end bike accumulates dirt and becomes contaminated, the hysteresis increases and absorbs more of the overtravel. It can therefore be seen that there is a need for a device that prevents the hysteresis from increasing due to contamination and assists the derailleur biasing spring in pulling the control cable toward the derailleur for quick upshifting.

Control cable contamination can also corrode the control cable, further increasing friction between the control cable and the sheath. In addition, such friction will increase control cable wear and can cause premature failure of components connected with the control cable.

To reduce control cable contamination, several manufacturers have attempted to seal the entrance of the control cable sheath with a dynamic seal. A typical dynamic seal includes a sheath having end cap and an o-ring. In operation, the o-ring attaches internal to the end cap and circumscribes the control cable; the end cap attaches over the sheath entrance.

Dynamic seals have several significant drawbacks. For example, friction is generated between the seal and the internal control cable. Further, movement of the control cable into the sheath can, and in most instances will, carry moisture and dirt into the sheath. A need therefore exists for a means of inhibiting contamination of the control cable while minimizing frictional forces associated with the movement of the control cable.

It is therefore an object of the present invention to provide a control cable pre-load and seal system for use with a bicycle derailleur gear shifting system%

It is another object of the present invention to provide a means for inhibiting contamination of a control cable while minimizing frictional forces associated with the movement of the control cable.

It is yet another object of the present invention to provide a control cable seal and pre-load system having a minimum number of components and readily adaptable on conventional derailleur-actuated multiple-gear bicycles.

SUMMARY OF THE INVENTION

The bicycle derailleur cable pre-load and sealing system of this invention achieves positive dynamic sealing at the point where most of the dirt and moisture enter the cable system. It does so using only a static seal. Therefore, there is no friction penalty which normally occurs with a dynamic seal. It also contributes a pre-load force on the control cable which enhances shifting performance.

In accordance with objectives and advantages of the present invention, the bicycle control cable tensioning device comprises:

- an elongated resilient tubular member having first and second opposed ends, the tubular member being adapted to slideably receive a control cable therethrough;
- a cable connector disposed adjacent the first end and adaptable to affix the first end to the control cable; and
- a frame connector disposed adjacent the second end and adaptable to affix the second end to a bicycle frame, the resilient tubular member adapted to be elastically stretched between the first and second ends prior to affixing the first end to the cable, whereby a tensile pre-load force is exerted on the cable in a direction from the first end of the tubular member toward the second end thereof.

In a preferred embodiment, the tubular member is pre-stretched in a first configuration.

In another preferred embodiment, the cable connector includes a cable seal. The cable seal forms a static seal about the control cable where the control cable connector attaches to the control cable.

It is an advantage of this invention to provide a pre-load and sealing system and device which are adapted for use with mechanical cable systems, such as bicycle derailleur gear shift systems. It is another advantage of this invention to seal portions of control cables which actuate mechanical devices from contamination due to moisture and dirt.

BRIEF DESCRIPTION OF THE DRAWINGS

The foregoing objectives, advantages and features of the invention and those which will be apparent below can be better appreciated after review of the following detailed description, taken in conjunction with the accompanying drawings, in which like parts are given like reference numerals and wherein:

FIG. 3 is a perspective view of the tensioning device of the present invention;

FIG. 5 is a cross-sectional view of the cable connector of FIG. 3; and

FIG. 6 is a perspective view of a tube clamp of FIG. 3.

DETAILED DESCRIPTION OF THE INVENTION

The cable pre-load and sealing system of the present invention substantially reduces or eliminates the disadvantages and shortcomings associated with prior art cable systems. As discussed in detail herein, the pre-load and sealing system effectively inhibits contamination of the control cable while providing means for pre-loading the control cable.

Figure 1:
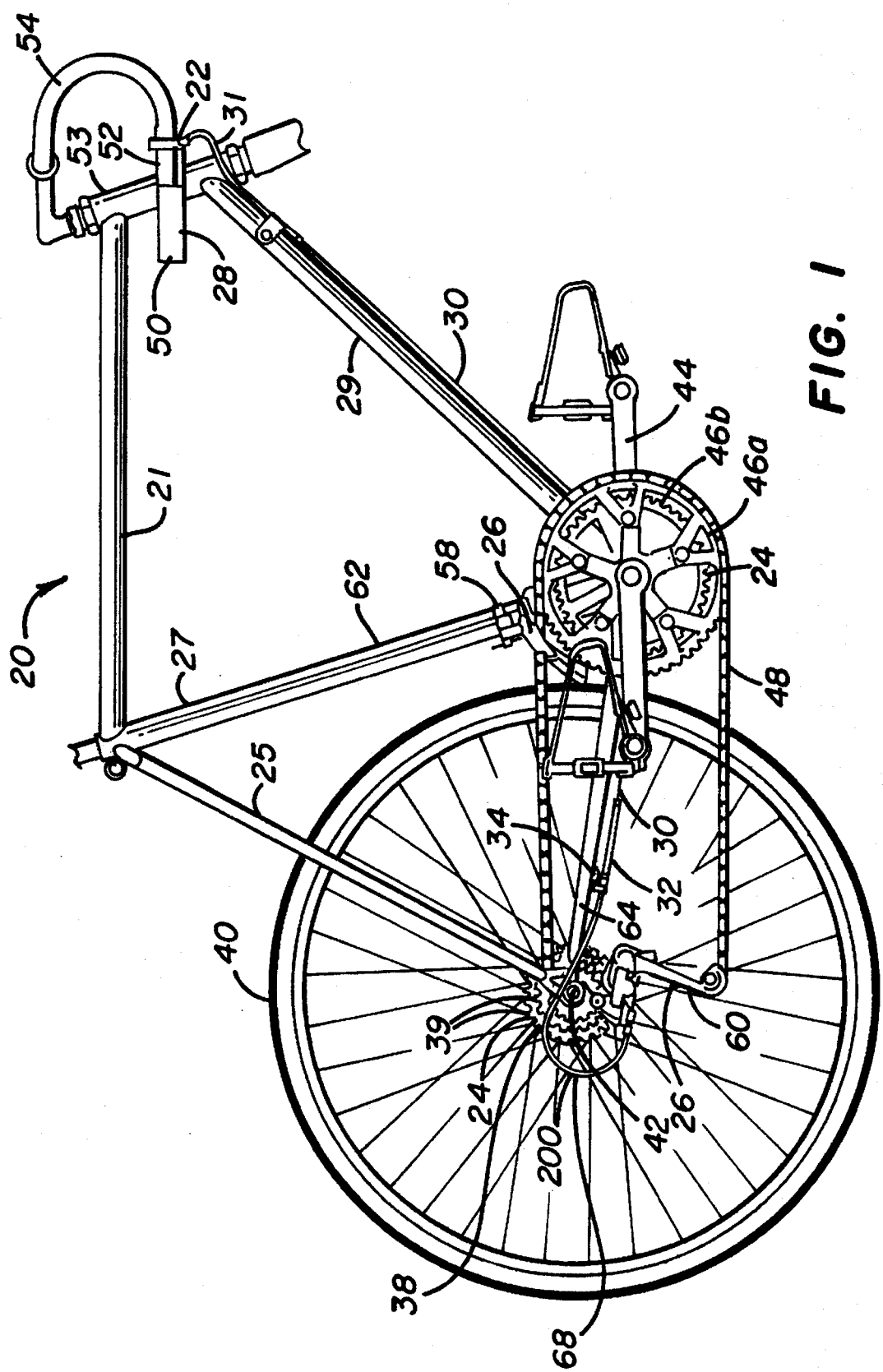
FIG. 1 is an orthogonal view of a bicycle frame employing the present invention.

Referring first to FIG. 1, a bicycle incorporating the invention is indicated generally at 20. Bicycle 20 includes a frame 21 and handlebar 54 inserted into a fork tube 53. The members of the frame 21 include a chain stay 64 disposed between a crank indicated generally at 44 and a rear hub 24, a seat stay 25 disposed between the hub 24 and the top of a seat tube 27, and a down tube 29 which is disposed between the fork tube 53 and crank 44. Disposed on the end of the handlebar 54 is a static grip 50. Fitting immediately inboard of grip 50 is a hand-rotatable shift actuator 52 by which the rider displaces a control cable 30. This shift actuator 52 can be any of various conventional types; reference is made, for example, to U.S. Pat. Nos. 5,197,927 and 5,102,372 and U.S. patent application Ser. No. 08/295,370 filed Aug. 24, 1994 for different kinds of shift actuators. These U.S. patents and pending U.S. Patent application are fully incorporated by reference herein.

The control cable 30, which preferably is a multi-filament alloy or steel cable, is of the Bowden type; that is, portions of it are housed in an outer housing or sheath. For example, the upper end of the cable 30 resides within a housing portion 31. Another cable portion resides within a cable housing 68 near the rear hub 24 of the bicycle 20.

In road bikes, the crank 44 would generally have only two chain rings 46a and 46b. However, in mountain bikes, the crank 44 can have a third chain ring, not shown, and the diameter of the smallest chain ring can be substantially different from that of the largest chain ring 46a.

A freewheel indicated generally at 38 has a plurality of sprockets 39 which are of various sizes. As in crank 44, when the bicycle 20 is configured as a mountain bike, the sprocket sizes can be substantially different from each other. A conventional bicycle drive chain 48 is routed from a selected one of the chain rings 46a, 46b around the crank 44 to a selected one of the sprockets 39 on the rear of the bicycle 20, allowing the rider to select a gear ratio from a combination of chain ring and sprocket sizes.

The bicycle derailleur, indicated generally at 60, shifts inboard (toward the center line of the bicycle) or outboard (away from the center line of the bicycle) in order to accomplish a shift between different ones of the sprockets 39 within freewheel 38. The derailleur movement is actuated by pulling or releasing the control cable 30. Pulling the cable 30 moves the derailleur inboard in a downshifting direction toward a larger sprocket.

As illustrated in FIG. 1, the bicycle 20 includes at least one braze-on 34 that attaches to the bicycle frame 21. The braze-on 34 comprises a hollow cylinder that aligns in parallel with the frame chain stay 64.

Figure 2:
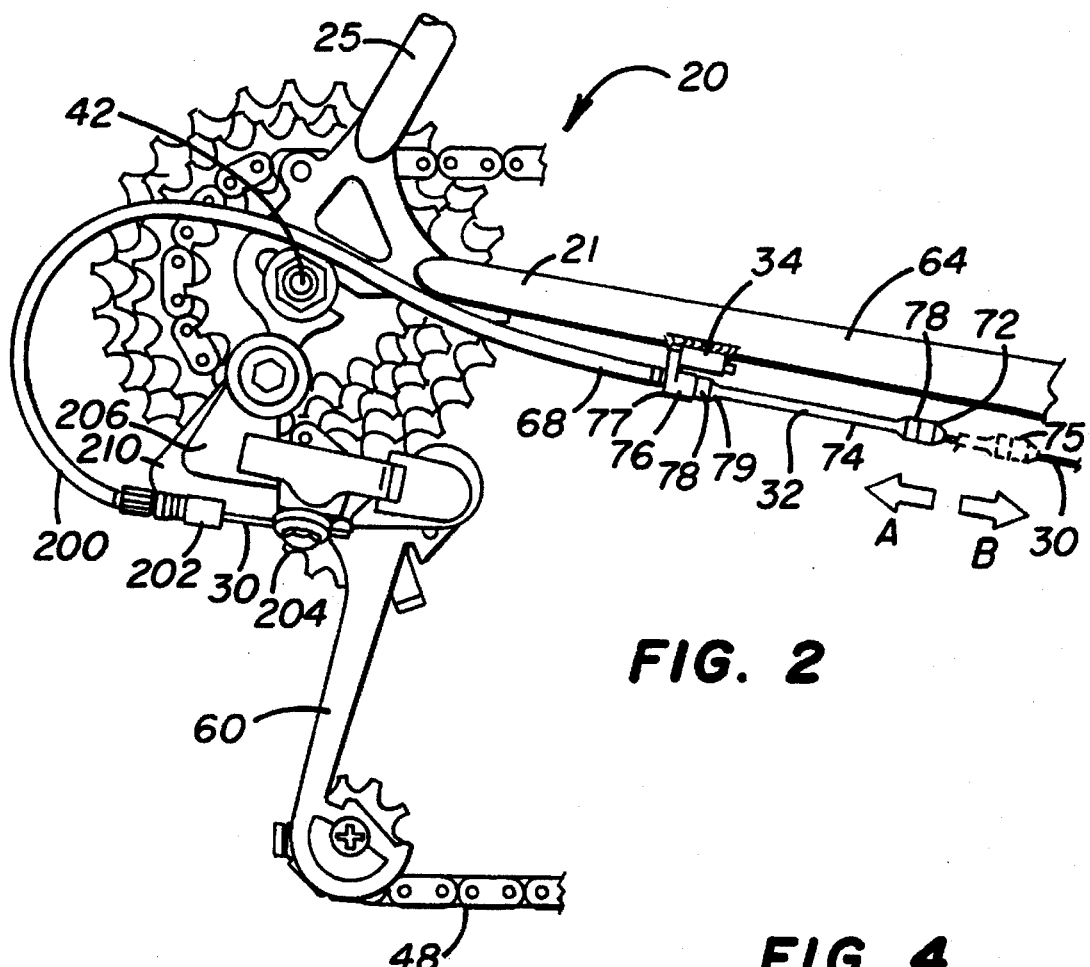
FIG. 2 is an enlarged view of a portion of the bicycle frame of FIG. 1.

Referring now to FIG. 2, there is shown a conventional derailleur system actuated by a cable system 200. The cable system 200 includes a derailleur control cable 30 which is commonly a Bowden type—that is, the cable 30 is contained within a sheath 68 that terminates in a ferrule 202 affixed to the b-knuckle 210. The cable 30 continues to a clamping screw 204 or the like that clamps the cable end to one of the derailleur sideplates such as the outboard sideplate 206. As the cable 30 exits the ferrule 202, the cable 30 is directed in a first direction. The cable 30 is also commonly clamped to the sideplate 206 in a second direction, and this can often be quite different from the first direction depending on how far inboard or outboard the derailleur 60 has been pulled by the cable 30.

As Illustrated In FIG. 2, the pre-load and sealing device 32 of the present invention attaches to the chain stay 64 of the bicycle frame 21. According to the invention, the device 32 sealably attaches to the sheath 68 which protects of the control cable 30 from damage and contamination.

The pre-load and sealing device 32 includes a control cable connector 72, a tubular member 74 and a frame connector 76. The tubular member 74 and the cable connector 72 are designed and adapted to circumscribe the control cable 30. When the cable connector 72 is secured to the control cable 30 (as discussed in detail below), the cable connector 72 moves in relation to the control cable 30 as indicated by arrows A and B.

According to the invention, the tubular member 74 is fabricated from a resilient material to facilitate pre-loading of the control cable 30. By the term "pre-loading" as used herein, it is meant to mean the application of a force to the control cable biasing it in the upshift direction.

In a preferred embodiment of the invention, the tubular member 74 is axially resilient and stretches from a first configuration to a second configuration, shown in phantom and indicated generally as 75 (FIG. 2). Thus, when the tubular member 74 is stretched to the second configuration 75 an axial tensile (i.e. tension) force is produced and exerted upon the control cable 30 by virtue of the resilient tubular member 74 attempting to return to its unstretched length.

As will be recognized by one of ordinary skill in the art, the tubular member 74 can be fabricated from various conventional resilient materials, such as rubber or surgical tubing. Alternatively, the tubular member 74 can comprise a coil spring encased in a tubular housing so as to form a bellows.

According to the invention, variable control cable 30 pre-load forces may be achieved by varying the second configuration 75 position. The greater the tubular member 74 is stretched, the greater the pre-load (i.e. tension) applied to the control cable 30. However, enough elasticity must remain in the tubular member 74 to allow the control cable 30 to move the approximately 0.70 to 1.5 inches which is required to shift the derailleur 60 between its farthest inboard and outboard positions.

Referring now to FIG. 3, the length and the outside diameter of the tubular member 74 is designated by the letters "l" and "$d_o$", respectively. When the resilient tubular member 74 stretches axially, the length "l" increases and the outside diameter "$d_o$" decreases.

In a preferred embodiment, the tubular member 74 has a length "l" within the range of 5–15 centimeters (cm) when the tubular member 74 is in a relaxed state. More preferably, the relaxed length "l" is within the range of 10–13 cm.

In another embodiment, the tubular member 74 has an outside diameter "$d_o$" within the range of 0.25–1.0 cm when tubular member 74 is in a relaxed state. Preferably, the tubular member 74 has an outside diameter "$d_o$" within the range of 0.4–1.0 cm when the tubular member is in a relaxed state.

It can be appreciated that the length "l" and the outside diameter "$d_o$" of the tubular member 74 can vary beyond the aforementioned ranges to increase or decrease tension in the tubular member 74. It is, however, desirable to have a tubular member 74 with an outside diameter "$d_o$" within the aforementioned ranges to minimize the risk of failure of the tubular member 74 and to optimize gear shifting performance.

As previously stated, pre-loading the control cable 30 in the manner disclosed herein counteracts various frictional forces between the control cable 30 and the sheath 68 during movement of the control cable 30. Pre-loading the control cable 30 also assists the derailleur 60 when the derailleur 60 draws the control cable 30 through the sheath 68 during upshifting.

Referring now to FIG. 2, the tubular member 74 includes a pair of tube clamps 78 disposed on each end thereof. The tube clamps 78 are designed and adapted to secure one end of the tubular member 74 adjacent the cable connector 72 to the cable 30 and the other end of the tubular member 74 to the frame connector 76 (FIG. 3).

Figure 4:
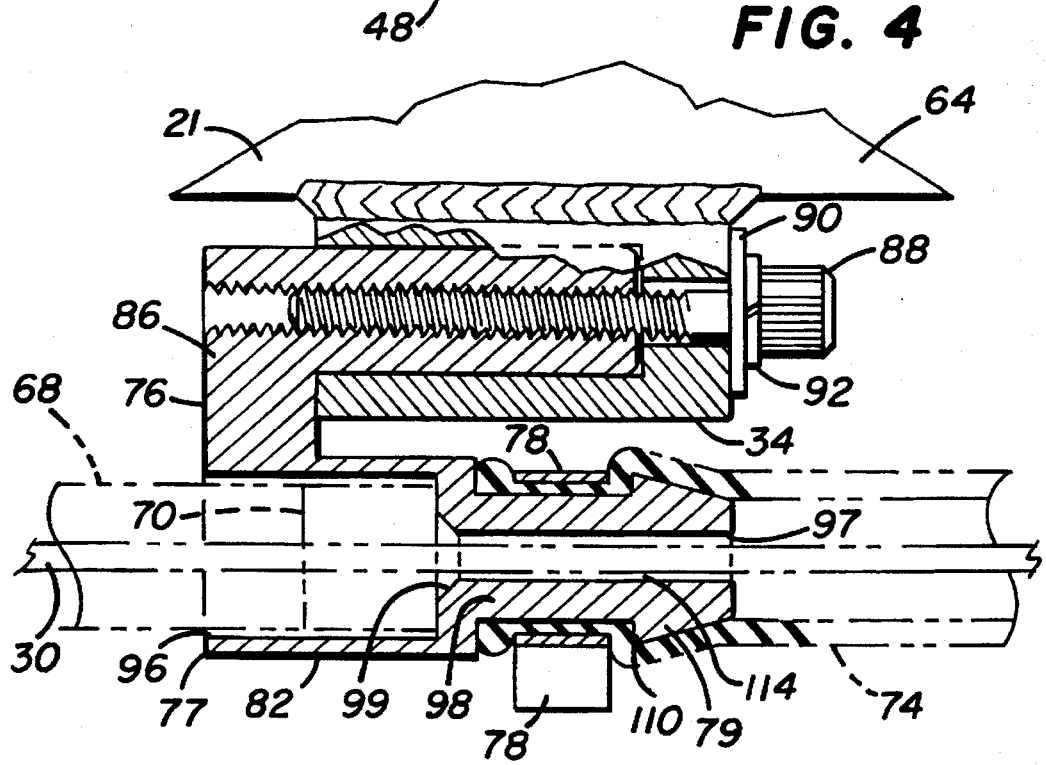
FIG. 4 is a cross-sectional view of the frame connector of the FIG. 3.

As illustrated in FIGS. 2 and 4, the frame connector 76 removably attaches to the braze-on 34 of the bicycle frame 21. The frame connector 76 has two ends 77, 79, with one end 77 of the frame connector 76 adapted to receive the sheath 68. The other end 79 of the frame connector 76 inserts into and locks with the tubular member 74, securing one end of the tubular member 74 stationary with respect to the bicycle frame 21.

Although the pre-load and sealing device 32 is shown attached to the chain stay 64, the device 32 can attach to a control cable 30 at various other desired positions on the frame 21. Such positions include the seat tube 62, the forks and other parts of the bicycle frame 21. The pre-load and sealing device 32 can also be used with various other cable actuated systems, such as braking systems.

Referring now to FIG. 3, the pre-load and sealing device 32 further includes a cable lumen 114, extending through the frame connector 76, the tubular member 74 and the cable connector 72. The control cable 30 extends coaxially through the cable lumen 114.

According to the invention, the pre-load and sealing device 32 is sealably connectable with sheath 68. The sheath 68 includes an end cap 70 that circumscribes an end portion of the sheath 68 and is insertable into the frame connector 76. The end cap 70 is preferably fabricated from a rigid corrosion resistant material such as brass or stainless steel.

As illustrated in FIG. 3, the frame connector 76 includes a housing 82, an outrigger 84, a cylindrical slide 86, a bolt 88, a lock washer 90, a retaining washer 92 and a seal 94. The housing 82 includes a cylindrical interior portion 96 and a neck 98. The interior portion 96 receives and seals the end cap 70 of sheath 68. The seal 94 preferably includes grease inserted between the cylindrical interior 96 and the control cable end cap 70. According to the invention, the neck 98 attaches to the tubular member 74 at one end thereof.

In a preferred embodiment, the cylindrical slide 86 and the housing 82 are formed as an integrated unit. The cylindrical slide 86 is designed and adapted to engage the cylindrical braze-on 34 of the bicycle frame 21.

The cylindrical slide 86 includes a threaded portion 87 which extends axially through the cylindrical slide 86 and is adapted to threadably receive the bolt 88. A retaining washer 92 and a lock washer 90 are also provided which circumscribe the bolt 88. The bolt 88 preferably has a head 100 that includes a 2 millimeter (mm) hexagonal impression (not shown) to facilitate rotation of the bolt 88 by a conventional hex wrench.

Referring now to FIG. 4, there is shown the frame connector 76 of the invention attached to the bicycle frame 21. According to the invention, bolt 88 attaches axially with the cylindrical slide 86 to secure the frame connector 76 to the braze-on 34 when the cylindrical slide 86 engages braze-on 34. As illustrated in FIG. 4, the lock washer 90 and retaining washer 92 interpose between the bolt 88 and the cylindrical slide 86. Tightening of the bolt 88 compresses the washers 90 and 92 against the braze-on 34 to lock the cylindrical slide 86 in rigid attachment with the braze-on 34.

As illustrated in FIGS. 3 and 4, the cylindrical interior 96 of the housing 82 preferably includes a smooth inner surface for receiving the end cap 70 of the sheath 68. The cylindrical interior 96 includes a narrow segment 97, which receives the control cable 30 and guides the control cable 30 with respect to the sheath 68, and a tapered segment 99 formed between the narrow portion 97 and the cylindrical interior 96 (FIG. 4). The neck 98 of the housing 82 includes lip 110 which is adapted to engage tubular member 74 when the neck 98 inserts into tubular member 74. The tube clamp 78 circumscribes the tubular member 74 and the connector neck 98 to secure the tubular member 74 to the frame connector 76.

With particular reference to FIG. 5, there is shown the cable connector 72 in accordance with the present invention. As stated, the cable connector 72 receives and sealably attaches to the control cable 30.

The cable connector 72 includes a threaded portion 102 disposed on one side thereof, a neck 104, a connector lip 120, a cable seal 112 and a setscrew 108. The set screw 108 is adapted to threadably engage the threaded portion 102 of the cable connector 72 and secure the cable connector 72 to the control cable 30.

As illustrated in FIG. 5, the cable connector neck 104 extends axially from the cable connector 72 to receive an end of tubular member 74. The lip 120 similarly circumscribes the neck 104 to engage tubular member 74 (see FIG. 3).

According to the invention, the cable seal 112 forms a static seal about the control cable 30. The cable seal 112 preferably includes an annular insert 113 and grease disposed between the insert 113 and the cable 30. The annular insert 113 is preferably fabricated out of a conventional elastomeric material.

When the control cable 30 moves, the cable seal 112 moves with the control cable 30 to form a static seal therebetween. It can be appreciated, that various cable seals 112 including resilient o-rings may be used accordance with the present invention.

The setscrew 108 includes a tip 116 and a head 118. The head 118 preferably includes a hexagonal impression for rotation by a conventional 1.5 mm hex key. The set screw tip 116 includes a flat surface which engages the control cable 30 upon rotation of the setscrew 108 and secures the control cable 30 with respect to the cable connector 72. It can be appreciated that any of a number of devices which are capable of securing the cable connector 72 to a control cable may be employed within the scope of this invention.

Referring now to FIG. 6, there is shown a tube clamp 78 in accordance with the present invention. The tube clamp 78 includes a tensioner 120, slots 126, a radial lock 124 and an axial lock 122. The tensioner 120 comprises a curved portion of the tube clamp 78 which spring biases the tube clamp 78 in a closed configuration as shown. Each lock 124, 126 includes a protuberance 130 that engages with a respective slot 126. The tensioner 120 biases the tube clamp 78 to uniformly grip a tubular member when the tubular member 74 circumscribes, for example, the neck 98 of connector 72.

It can be appreciated that the tube clamp 78 can take many forms in accordance with the present invention. For example, the clamp 78 may be an adjustable clamp. A clamp can also be formed integral with the frame connector 76 and with the cable connector 72, respectively.

While the foregoing detailed description describes the present invention in terms of a preferred embodiment, it is to be understood that the foregoing description is illustrative only and not limiting of the disclosed invention. For example, the specific details of the various attachments can vary, as can the connection of the tubular member to the attachments. Additionally, the geometry of the tubular member can vary to regulate the tension applied by the tubular member to the control cable. The tubular member can, for example, be varied to apply relatively uniform tension to the control cable. The invention is to be limited only by the claims as set forth below.

What is claimed is:

1. A bicycle control cable tension device, comprising:
   a shift actuator operatively affixed to a bicycle having a frame:
   a derailleur associated with a rear wheel of the bicycle;
   a control cable operatively connected to said derailleur and said shift actuator;
   a resilient tubular member disposed between said derailleur and said shift actuator, said tubular member adapted to slideably receive said control cable therethrough whereby said control cable is encased by said tubular member, said tubular member having first and second opposed ends;
   a cable connector sealingly connected to said first end of said tubular member, said cable connector adapted to affix said first end of said tubular member to said control cable;
   a frame connector attachable to the bicycle frame and adapted to sealingly engage said second end of said tubular member, said tubular member adapted to be elastically stretched between said first and second ends prior to affixing said first end to said cable, whereby a pre-load force is exerted on said cable intermediate said derailleur and said shift actuator.

2. The device of claim 1, wherein said cable connector includes a cable seal, said cable seal adapted to form a static seal about said control cable whereby when said cable connector is attached to said control cable and said second end of said tubular member is sealingly engaged by said frame connector the length of said control cable encased by said tubular member is operatively sealed.

3. The device of claim 2, wherein said cable seal includes an annular elastomeric insert.

4. The device of claim 1, wherein the tubular member includes a pair of tube clamps, said tube clamps being removably attachable to said first and said second ends of said tubular member to attach said tubular member to said cable connector and said frame connector.

5. The device of claim 1, wherein said tubular member has a relaxed length in the range of approximately 5–15 cm.

6. The device of claim 1, wherein said tubular member has a relaxed length in the range of approximately 10–13 cm.

7. The device of claim 1, wherein said tubular member has an outside diameter in the range of approximately 0.25–1.0 cm when said tubular member is in a relaxed state.

8. The device of claim 1, wherein said tubular member has an outside diameter in the range of approximately 0.4–0.6 cm when said tubular member is in a relaxed state.

9. A bicycle control cable sealing system, comprising:

a derailleur attached to a bicycle;

a shift actuator operatively affixed to the bicycle;

a control cable having first and second ends, said first end operatively connected to said derailleur and said second end operatively connected to said shift actuator;

a control cable sheath adapted to slideably receive said control cable therethrough, said cable sheath having first and second ends, said first end of said cable sheath being disposed proximate said derailleur;

a resilient tubular sealing member having first and second ends, said sealing member being adapted to slideably receive said control cable therethrough;

a sealing member connector having a cable lumen configured to receive said control cable, said sealing member connector being adapted to sealably engage said first end of said sealing member and said control cable;

a frame connector adapted to attach to the bicycle, said frame connector including first and second seals, said first seal adapted to sealably engage said second end of said cable sheath, said second seal adapted to engage said second end of said sealing member.

10. The sealing system of claim 9, wherein said second seal comprises an annular insert.

11. The sealing system of claim 9, wherein said first end of said cable sheath is affixed to said derailleur.

* * * * *

UNITED STATES PATENT AND TRADEMARK OFFICE
CERTIFICATE OF CORRECTION

PATENT NO. : 5,630,338
DATED : May 20, 1997
INVENTOR(S) : Sam H. Patterson, Frederick W. Day, Michael Larson and Brian Jordan It is certified that error appears in the above-identified patent and that said Letters Patent is hereby corrected as shown below:

In Column 2, line 27, after "new," delete "cleah" and insert therefore --clean--.

In Column 3, line 11, after "system" delete "%" and insert therefore --.--.

Signed and Sealed this

Fifth Day of January, 1999

Attest:

Attesting Officer

Acting Commissioner of Patents and Trademarks